United States Patent [19]

Lagasse et al.

[11] 4,091,663

[45] May 30, 1978

[54] TORQUE INDICATING DEVICE

[75] Inventors: Normand L. Lagasse, Milford; Richard P. Cuny, Stratford, both of Conn.

[73] Assignee: Avco Corporation, Stratford, Conn.

[21] Appl. No.: 624,689

[22] Filed: Oct. 22, 1975

[51] Int. Cl.² ............................................. G01L 3/02
[52] U.S. Cl. ..................................... 73/136 R; 74/329
[58] Field of Search ................... 74/329, 330; 308/176; 73/140, 136 R

[56] References Cited

U.S. PATENT DOCUMENTS

| | | | |
|---|---|---|---|
| 2,957,343 | 10/1960 | Hornbostel | 73/140 |
| 3,155,006 | 11/1964 | Schroeder | 308/176 |
| 3,214,224 | 12/1965 | Lash | 308/176 |
| 3,528,713 | 9/1970 | Keller | 308/189 R |
| 3,828,610 | 8/1974 | Swearingen | 73/140 |
| 3,897,985 | 8/1975 | Davis et al. | 308/176 |
| 3,909,083 | 9/1975 | Vahle | 308/189 R |

*Primary Examiner*—Allan D. Herrmann
*Assistant Examiner*—R. C. Turner
*Attorney, Agent, or Firm*—Charles M. Hogan; Irwin P. Garfinkle; Ralph D. Gelling

[57] ABSTRACT

The torque transmitted through a pair of helical gears mounted on a lay shaft imposes an axial force on the lay shaft which is reflected into fluid pressure to indicate the magnitude of the torque. By journaling the lay shaft within sleeves which are also the inner races of a pair of roller bearings its axial movements are sensitively transmitted to a nonrotating piston rod mounted in ball bearings within the bore of the lay shaft. The piston is displaceable into a cylinder supplied with pressurized lubricating fluid through a valve responsive to the axial displacement of the piston. The fluid pressure in the cylinder balances the axial force transmitted to the piston and is proportional to the transmitted torque.

7 Claims, 2 Drawing Figures and # TORQUE INDICATING DEVICE

BACKGROUND OF THE INVENTION

This invention relates to torque sensing devices, particularly to those used to measure the torque output of a combustion engine. The torque measurement may be employed to control the output of the engine or balance the output of several parallel engines.

A well known method of determining torque is to sense the axial force produced on a helical gear transmitting the torque. A challenging design problem is to rotably support the gear to transmit the torque and provide low fractional resistance to axial movement in order that good sensitivity to torque changes are obtained. In addition the torque sensing device desirably should be able to operate for short periods of lubricating fluid supply failure without damage. Accordingly the object of this invention is to provide a torque sensing device which senses the torque reaction force on a helical gear with high sensitivity and is capable of operating without lubricating oil supply for short periods of time. Further objects of this invention are to provide a torque indicating device of high load capability and compactness.

SUMMARY OF INVENTION

Two helical gears fixed on a lay shaft respectively engage a helical driving gear which receives the output of an engine and a helical driven gear which is connected to the load, incidentally accomplishing a speed reduction by virtue of the gear size ratios. The operating loads imposed upon the helical teeth of the lay shaft gears produce an axial force upon the lay shaft which is proportional to the torque transmitted through these gears. The lay shaft is journaled in a pair of sleeves which also serve as the inner races of a pair of roller bearings whose outer races are mounted in a supporting housing. The roller bearings allow rotation of the sleeves along with the lay shaft so that supplied lubricating fluid readily floats the lay shaft journals within the sleeves providing high load bearing capability and low frictional resistance to axial movement of the lay shaft. Ordinarily, interrupting the lubricating fluid supply to a journal bearing quickly damages the bearing, a limitation overcome by this invention. Here, the roller bearings allow the lay shaft and the sleeves to rotate together with no impairment during interruption of the lubricating fluid supply. The roller bearings themselves, because of their inherent low rolling friction can operate without impairment for a short interruption in lubricating fluid supply.

The use of the inner race of the roller bearing as a journal bearing is very conservative of space, yielding a compact arrangement of high load capability. This arrangement is superior, for instance, to the use of a ball bearing assembly which would have to be much larger to sustain the imposed loads.

Within the bore of the lay shaft, a pair of ball bearings retain a piston rod imposing the axial, but not the rotational, movement of the lay shaft upon a piston which is displaceable into a cylinder in the housing. The cylinder is filled from a pressurized lubricating fluid source through a poppet valve responsive to axial movements of the piston. The fluid pressure developed in the cylinder balances the axial torque force imposed upon the piston and hence is proportional to the torque transmitted through the lay shaft. A means sensitive to the fluid pressure in the cylinder provides an indication of the torque.

DETAILED DESCRIPTION OF THE INVENTION

Figure 1:
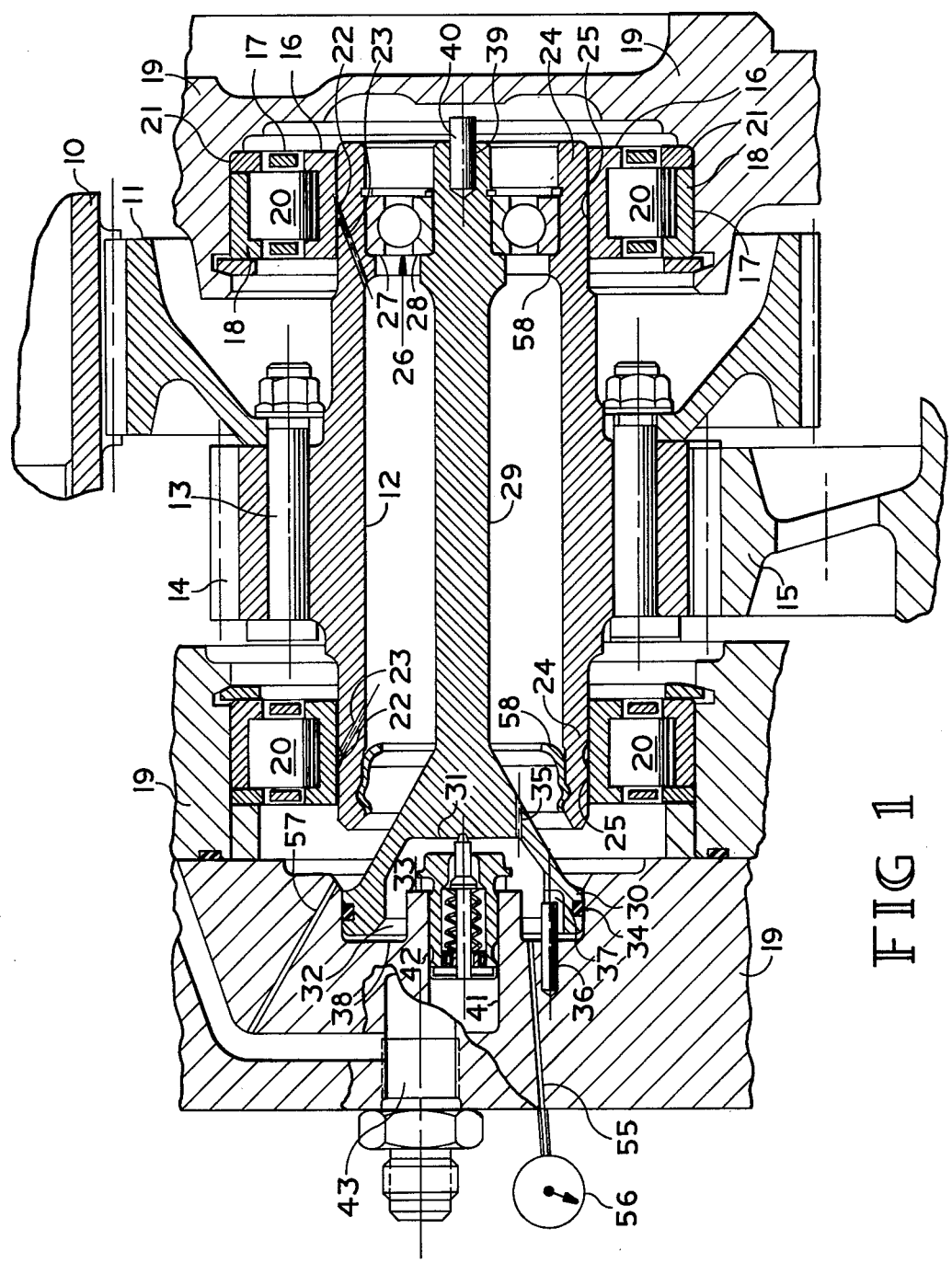
FIG. 1 is a longitudinal section of the invention.
Figure 2:
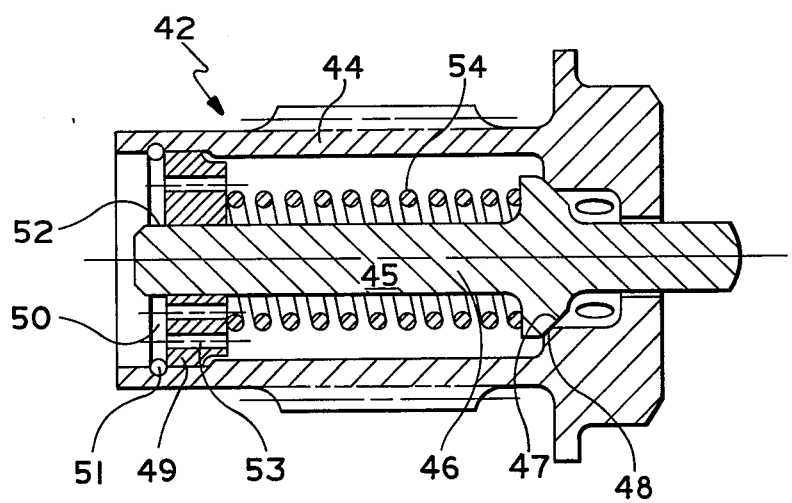
FIG. 2 is an enlarged view of valve shown in FIG. 1.

Referring to the drawings, engine torque is transmitted from an input helical gear 10 to a meshing helical gear 11 fixed on a lay shaft 12 by bolts 13. Integral with the layshaft is a helical gear 14 which in turn transmits the engine torque to a meshing output helical gear 15. The lay shaft 12 is journaled in the inner races 16 of a pair of roller bearings 17 with a diametral clearance-to-journal diameter ratio of approximately 0.00055 inches being provided. The outer races 18 of the roller bearings 17 are fixed within a housing generally indicated by reference character 19. The rollers 20 of the bearing 17 are trapped in position by the outer race 18 and by a disc 21.

Around the circumference of the lay shaft 12 at the center of the journal area for each inner race 16 of the roller bearings 17 is a groove 22 which in conjunction with the inner race 16 forms an annulus for distribution of lubricating fluid to the journal. Lubricating fluid enters this annulus 22 by a passageway 23 through the lay shaft 12.

The input gear 10, the output gear 15 and the lay shaft gears 11 and 14 have helical teeth which, during rotation, develop an axial force proportional to the torque transmitted through these gears. This force urges the lay shaft 12 to the left and is the basis for the torque measurement in this invention. The lay shaft 12 is supported so that it can rotate to transmit the engine torque and is axially displaceable with very low friction in response to the engine torque. The low friction for axial displacement of the lay shaft 12 results from journaling the lay shaft 12 in the inner race 16 of the roller bearing 17.

When the lay shaft journal 24 is not rotating it contacts and rests on the bottom of the inner race circumference 25. The inner race 16 in turn rests on the bearing rollers 20. As rotation of the lay shaft 12 begins, the rolling friction of the rollers 20 is less than the sliding friction of the lay shaft journal 24 relative to the inner race 16 so that the inner race 16 begins to rotate. As the inner race 16 rotates, the lubricating fluid adhering to the inner surface of the inner race 16 is carried between the journal 24 and the inner race 16 at their contact point 25. As lay shaft 12 rotates the lubricating fluid adhering to the surface of the lay shaft journal 24 also is carried between the journal 24 and inner race 16 at the contact point 25. As sufficient speed is developed, sufficient lubricant is carried between these surfaces to float the journal 24 within the inner race 16 and allow slippage between these two parts. Low frictional resistance to axial movement of the lay shaft 12 results.

In a conventional journal bearing only the journal rotates and is the sole surface to carry lubricating fluid between the journal and its bearing. In this invention, two surfaces rotate and carry a greater amount of lubricating fluid between them than in a conventional journal bearing providing greater load carrying capability. Moreover, if the supply of lubricating fluid is interrupted so that the journal 24 is not floated within the inner race 16, the rollers 20 will allow the journal 24 and the inner race 16 to rotate together as a unit preventing damage to these elements. The roller bearing 17 itself, by virtue of its inherent low rolling friction, is capable of operation without damage for short periods of lubricating fluid supply failure.

The bore of the lay shaft 12 contains a ball bearing assembly 26 with its outer race 27 fixed within the bore and its inner race 28 mounted on one end of a piston rod 29 so that the rod 29 follows the axial movements of the lay shaft 12. The other end of the rod 29 extends out of the lay shaft 12 and has a cylindrical length of increased diameter to function as a piston 30. The end face of the piston 30 has a cavity 31.

In the housing generally indicated by a reference character 19 is a blind annular bore 32 coaxial with the rod 29. The piston 30 is axially displaceable into the bore 32 forming a variable volume 33. A piston ring seal 34 is provided between the piston 30 and the bore 32. A narrow passageway 35 through the annular wall of the piston vents the variable volume 33.

The piston 30 is prevented from rotating by a pin 36 extending from the housing 19 and fitting loosely into an axial slot 37 in the piston 30. The limit for axial travel of the piston 30 to the left is fixed by the bottom 38 of the annular bore 32.

The right end of the piston rod 29 has a drilled hole 39 into which is pressed a protruding pin 40 of resilient material. The limit for axial travel of the rod 29 to the right is fixed by the pin 40 coming to rest on a portion of the housing 19.

Concentric with the annular bore 32 in the housing 19 is a cylindrical bore 41 which has a valve assembly 42 threaded into its open end. The valve assembly 42 regulates fluid flow to the variable volume 33.

The engine has a lubricating system (not shown) in which lubricating fluid is pressurized by a pump (not shown) and distributed to various elements in the engine requiring lubrication. A branch of the lubricating system delivers lubricating fluid to a passageway 43 which leads to the inlet of valve assembly 42.

The valve assembly 42 includes a hollow cylindrical housing 44 for a poppet valve element 45 comprised of a rod 46 having thereon a frustoconical flange 47. The end of the housing 44 which discharges into the variable chamber 33 has a narrowed opening 48 forming a seat for the poppet flange 47. An end of the poppet rod 46 protrudes through the housing opening 48 and is capable of contacting the piston 30 at the bottom of the cavity 31. Pressed into the other end of the valve housing 44 is a disc 49 which is retained by a ring 50 positioned in a groove 51 in the housing 44. The disc 49 has a central hole 52 to guide one end of the poppet rod 46 and smaller holes 53 to admit lubricating fluid to the interior of the valve housing 44 from the passageway 43. A spring 54 acts against the disc 49 and the flange 47 on the poppet valve element 45 urging the poppet valve element 45 to seat against narrow opening 48 in the valve housing 44.

In response to the torque transmitted through the lay shaft 12, the lay shaft 12 and the piston 30 are urged toward the valve assembly 42 and against the poppet rod 46, unseating the poppet valve element 45 and admitting pressurized lubricating fluid into the variable volume 33. The resulting fluid pressure in the variable volume 33 produces a force on the piston 30 which opposes the torque reaction force on the lay shaft 12. The piston 30 reaches an equilibrium axial position where the fluid force on the piston 30 is in balance with the torque reaction force on the lay shaft 12 and the valve assembly 42 is held open by the piston 30 sufficiently to just compensate for the lubricating fluid leak past the seal 34 and the restricted efflux through the venting passageway 35. As engine torque changes, the piston 30 moves to a new equilibrium position to restore the balance. The result is that the fluid pressure in the variable chamber 33 is proportional to the engine torque transmitted through the lay shaft 12 provided frictional resistance to axial movement of the lay shaft 12 and piston 30 is small relative to the torque reaction force exerted on the lay shaft 12. This requirement is achieved by the features of this invention. The fluid pressure in the variable chamber 33 is communicated through a passage 55 in the housing 19 to a pressure gauge 56 which provides a visual indication of the engine torque.

Increased leakage past the seal 34 will slightly change the equilibrium position of the piston 30, but not the fluid pressure required to balance a given reaction torque. Only very small axial movements of the piston 30 are required to maintain the balance.

From another branch of the lubricating system (not shown) a passageway 57 in the housing 19 directs a jet of lubricating fluid into the bore of the lay shaft 12. The lubricating fluid is centrifuged to the bore surface and collects to a height determined by the dams 58 within the bore. Some of this lubricating fluid flows through the passageways 23 in the lay shaft 12 to lubricate the journaled areas 24 while the rest overflows the dams 58, falls to the bottom of the housing (not shown) and is scavenged out.

We claim:

1. A device for indicating the torque exerted on a rotatable shaft adapted to transmit motion from an input helical gear to an output helical gear comprising:

a housing;

a pair of spaced anti-friction bearings mounted in the housing, each having outer and inner races, said outer race being fixed in said housing;

a lay shaft rotatably mounted through the inner races and being axially slidable therein, said shaft being constructed with at least one helical gear fixed thereon for engaging the input and output helical gears, said shaft thereby being subject to an axial force proportional to the torque being transmitted from the input to the output gears, said axial force causing a proportional axial displacement of said shaft;

means for establishing a film of lubricating fluid between the lay shaft and said inner races of said pair of anti-friction bearings;

a piston operatively associated with one end of the lay shaft for axial displacement therewith;

a blind annular axial bore constructed in the housing to receive the piston and to accommodate limited axial movement thereof;

a source of pressurized lubricating fluid connected to the bore;

a valve connected to control the flow of pressurized fluid to the bore and operatively associated with the piston to vary said flow in response to the axial displacement of the lay shaft, thereby causing a fluid pressure which balances the axial force exerted on the shaft, regulates the displacement of said piston and is proportional to the torque transmitted through the shaft; and means responsive to the fluid pressure in the chamber for generating a signal proportional thereto.

2. The invention as defined in claim 1 wherein said lay shaft has an axial bore therethrough, and the piston is mounted on a rod which is journaled within the bore of said lay shaft.

3. The invention as defined in claim 2 wherein the piston rod is journaled within the bore of the lay shaft by means of a ball bearing assembly with the inner race fixed on said piston rod and the outer race fixed in the bore of said lay shaft.

4. The invention as defined in claim 1 further comprising means to limit the displacement of said piston in the direction away from the annular axial bore.

5. The invention as defined in claim 1 wherein said means for establishing a film of lubricating fluid between said lay shaft and said inner races of said pair of anti-friction bearings comprises a circumferential groove in said lay shaft at each of the surface areas encircled by said inner races; and means for supplying lubricating fluid to said grooves.

6. The invention as defined in claim 5 wherein the means for supplying lubricating fluid to the circumferential grooves in the lay shaft comprises:
- a passageway in the housing in communication with the pressurized lubricating fluid source, the passageway discharging lubricating fluid into the bore of the lay shaft;
- a ridge within the bore at each end of the lay shaft so that lubricating fluid centrifuged against the wall of the bore forms a pool; and
- a passageway through the lay shaft to transfer lubricating fluid from the bore of the lay shaft to each of the circumferential grooves in the lay shaft.

7. The invention as defined in claim 1 wherein the pair of spaced anti-friction bearings is a pair of roller bearings.

* * * * *

UNITED STATES PATENT AND TRADEMARK OFFICE
CERTIFICATE OF CORRECTION

PATENT NO. : 4,091,663
DATED : May 30, 1978
INVENTOR(S) : Normand L. Lagasse, Richard P. Cuny It is certified that error appears in the above—identified patent and that said Letters Patent are hereby corrected as shown below:

Column 1, line 14, cancel "fractional" and insert therefor --frictional--.

Signed and Sealed this

Sixth Day of February 1979

[SEAL]

Attest:

RUTH C. MASON
Attesting Officer

DONALD W. BANNER
Commissioner of Patents and Trademarks